US010327394B2

(12) United States Patent
Willibald

(10) Patent No.: US 10,327,394 B2
(45) Date of Patent: Jun. 25, 2019

(54) CUTTING DEVICE

(71) Applicant: Artur Willibald, Überlingen (DE)

(72) Inventor: Artur Willibald, Überlingen (DE)

(73) Assignee: PRINOTH GmbH, Herdwangen (DE)

( * ) Notice: Subject to any disclaimer, the term of this patent is extended or adjusted under 35 U.S.C. 154(b) by 1208 days.

(21) Appl. No.: 14/400,864

(22) PCT Filed: May 16, 2013

(86) PCT No.: PCT/EP2013/001453
§ 371 (c)(1),
(2) Date: Feb. 26, 2015

(87) PCT Pub. No.: WO2013/174496
PCT Pub. Date: Nov. 28, 2013

(65) Prior Publication Data
US 2015/0173310 A1 Jun. 25, 2015

(30) Foreign Application Priority Data

May 21, 2012 (DE) .................. 10 2012 009 852

(51) Int. Cl.
| B02C 18/00 | (2006.01) |
| A01G 23/06 | (2006.01) |
| B02C 18/14 | (2006.01) |
| B02C 18/18 | (2006.01) |
| A01B 33/10 | (2006.01) |

(52) U.S. Cl.
CPC ............ *A01G 23/067* (2013.01); *A01B 33/10* (2013.01); *B02C 18/145* (2013.01); *B02C 18/18* (2013.01)

(58) Field of Classification Search
CPC ..... B02C 18/18; B02C 18/184; B02C 18/145; A01G 23/067
USPC ......................................................... 241/294
See application file for complete search history.

(56) References Cited

U.S. PATENT DOCUMENTS

| 4,546,929 A | * | 10/1985 | Fritsch ................. B02C 18/186 |
| | | | 241/294 |
| 6,394,375 B1 | * | 5/2002 | Balvanz .............. B02C 13/2804 |
| | | | 241/197 |
| 7,938,350 B2 | * | 5/2011 | Doppstadt ............... B02C 18/18 |
| | | | 241/294 |

(Continued)

FOREIGN PATENT DOCUMENTS

| DE | 20 2005 009 859 U1 | 3/2006 |
| DE | 20 2005 010 337 U1 | 3/2006 |

(Continued)

OTHER PUBLICATIONS

Office Action dated Nov. 23, 2016 issued in corresponding AU patent application No. 2013265708.

(Continued)

*Primary Examiner* — Faye Francis
(74) *Attorney, Agent, or Firm* — Posz Law Group, PLC

(57) ABSTRACT

A cutting device for a comminution rotor, in particular for comminuting wood and/or soil, with at least one cutter holder. For providing a comminution rotor with low operation costs, the cutter holder has at least one groove, which at least partially receives a basis element of the comminution rotor and which has at least one longitudinal center line with at least two partial lengths that are oriented at an angle with respect to each other.

17 Claims, 8 Drawing Sheets

(56) References Cited

U.S. PATENT DOCUMENTS

Figure 1:
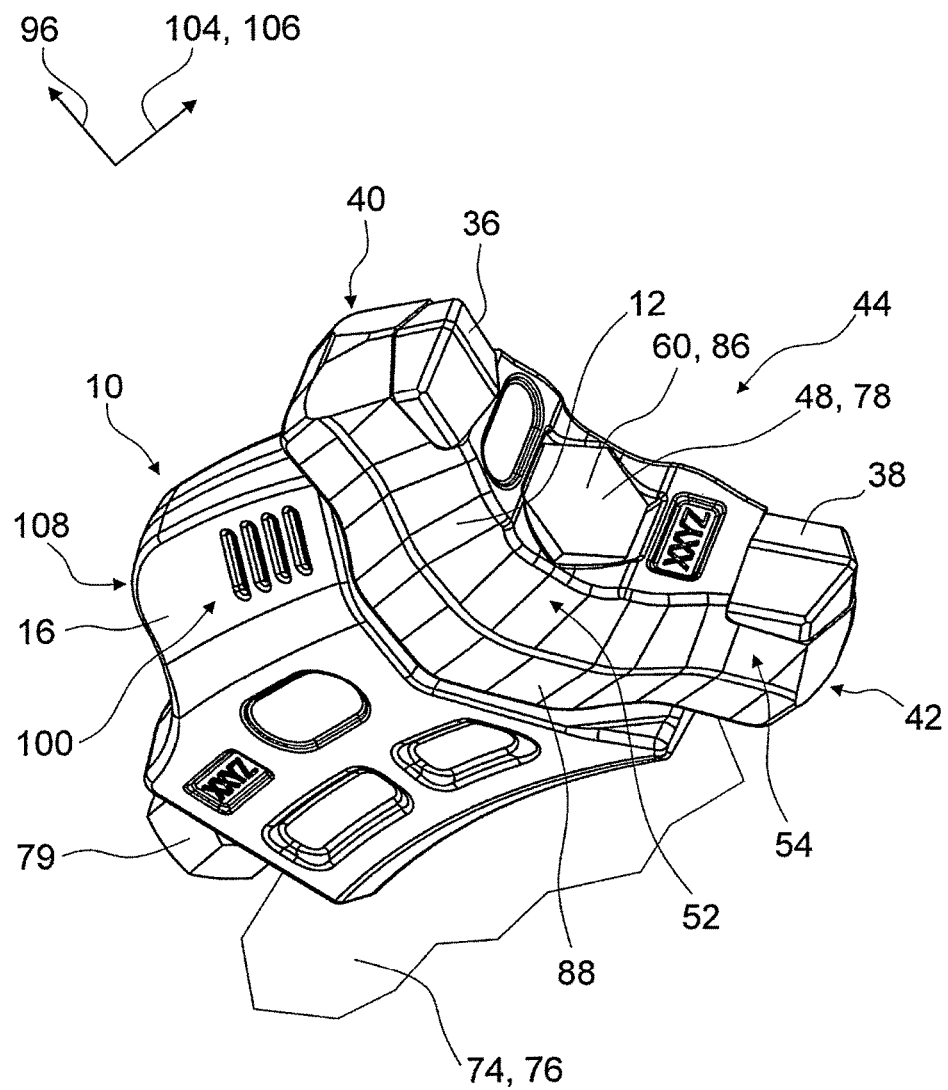

| | | | | |
|---|---|---|---|---|
| 8,231,072 | B2 * | 7/2012 | Willibald | A01B 33/08 |
| | | | | 241/294 |
| 9,943,037 | B2 * | 4/2018 | Stanley | A01G 3/002 |
| 2002/0017580 | A1 | 2/2002 | Ragnarsson | |
| 2004/0056129 | A1 | 3/2004 | Doppstadt | |
| 2007/0194161 | A1 | 8/2007 | Doppstadt et al. | |

FOREIGN PATENT DOCUMENTS

| | | |
|---|---|---|
| DE | 10 2006 032 295 A1 | 1/2008 |
| EP | 200300665 A1 | 12/2003 |

OTHER PUBLICATIONS

Reporting email explaining the content of AU Office Action dated Dec. 8, 2016.
International Search Report of the International Searching Authority dated Sep. 27, 2013 issued in corresponding International patent application No. PCT/EP2013/001453.
Partial translation of the German Search Report dated May 8, 2013 for corresponding DE patent application No. 10 2012 009 852.9.
Reporting letter explaining the content of RU Office Action dated May 12, 2017.
Office Action dated Apr. 20, 2017 issued in corresponding RU patent application No. 2014146708/13 (and English translation).
Search Report dated Apr. 19, 2017 issued in corresponding Ru patent application No. 2014146708/13 (and English translation).

* cited by examiner

US 10,327,394 B2

CUTTING DEVICE

CROSS REFERENCE TO RELATED APPLICATIONS

This application is a U.S. national stage application of International Patent Application No. PCT/EP2013/001453 filed on May 16, 2013, and claims priority to, and incorporates by reference, German Patent Application No. 10 2012 009 852.9 filed on May 21, 2012.

PRIOR ART

The invention relates to a cutting device according to the preamble of claim 1 and to a basis element according to the preamble of claim 12.

From DE 10 2006 032 295 A1 a cutting device is known for a comminution rotor which is provided for comminuting wood and/or soil, with at least one cutter holder which is provided for fixation to a basis element of the comminution rotor. The cutter holder comprises a base body with two parallel legs that are spaced apart from each other and are each provided, at an end region, with a bore, the bores being aligned with each other. In a mounted state the basis element, which is also provided with a bore, is arranged between the legs, a screw being passed through the aligned bores of the legs and of the basis element, as a result of which the cutter holder is fixed to the basis element. In an operating state, the cutter holder is braced against a stop arranged at the basis element.

The objective of the invention is in particular to provide a comminution rotor with advantageously low operating costs. The objective is achieved, according to the invention, by the characterizing features of patent claims 1 and 12, while advantageous embodiments and further developments of the invention may be gathered from the subclaims.

Advantages of the Invention

The invention is based on a cutting device for a comminution rotor, in particular for comminuting wood and/or soil, in particular for mulching, shredding and/or chopping, with at least one cutter holder.

It is proposed that the cutter holder comprises at least one groove which is provided to at least partially receive a basis element of the comminution rotor, and which has at least one longitudinal center line with at least two partial lengths that are oriented at an angle with respect to each other. A "cutting device" is in particular to be understood as a device which is provided to comminute, in particular to cut up and/or chop up and/or break up material, in particular wood and/or soil, in particular also rocks. In particular, the cutting device is provided to be fastened to the basis element of the comminution rotor. A "cutter holder" is to be understood, in particular, as a structural unit which, in a mounted state, fixates at least one cutter and which, in particular in at least one operating state, absorbs and/or transfers away forces acting on the cutter. The cutter can in particular be fastened directly to the cutter holder. The cutter can be connected to the cutter holder in any fashion that seems expedient to a person skilled in the art, in particular releasably, e.g. by a screw connection, or preferably nonreleasably, in particular by way of a one-part implementation. A "one-part implementation" is to mean, in particular, implementation at least by a substance-to-substance bond, e.g. by a welding process, an adhesive process, an injection process and/or another process that seems expedient to the person skilled in the art, preferably a soldering process, and/or formed of one part, e.g. by production from one cast and/or by production in a one-component or multiple-component injection molding procedure, and advantageously from a single blank. As an alternative, the cutter may also be fastened to the cutter holder via at least one further unit, in particular an adapter unit. A "cutter" is to be understood, in this context, in particular as an element which is provided to mechanically cut up and/or chop up and/or break up material, in particular wood and/or soil, in particular also rocks, in a comminution process. Preferentially the cutter consists at least partially of a material of greater hardness than the cutter holder, in particular of hardened steel or especially advantageously of a hard metal work material. "Provided" is to mean, in particular, specifically designed and/or equipped.

A "comminution rotor" is to be understood, in this context, in particular as a rotational body which is provided to be equipped with at least one cutting device, for carrying out a comminution process. In an operating state, the comminution rotor rotates about its longitudinal axis, whereby the cutting device is brought into contact with the material to be comminuted. By a "longitudinal axis" of the comminution rotor in particular a rotational symmetry axis of a geometrical cylinder with a minimum volume, which just still encompasses the comminution rotor, is to be understood. The comminution rotor in particular comprises a base body which is preferably embodied in a rotationally symmetrical manner and to which at least one basis element is fastend, in particular in a torque-proof manner. Especially advantageously, the base body is embodied at least partially as a round tube. The basis element may herein be fastened to the base body in any manner that seems expedient to the person skilled in the art, in particular by means of a screw connection and preferentially by a one-part implementation. Preferably the basis element is welded with the base body. A "basis element" is to be understood in particular as an element which, in a mounted state, fastens the cutting device to the base body of the comminution rotor, preferentially in a torque-proof manner.

A "groove" is in this context to be understood in particular as a recess in the cutter holder, which recess is formed at least partially and preferably entirely by a longitudinal deepening, the ends of which can in particular be open or closed. A "recess" is in this context to be understood, in particular, to be a material recess in a component. A "longitudinal deepening" is to be understood in particular as a deepening the length of which, i.e. the longitudinal extension of which, is greater than its maximum width, i.e. its transverse extension, and is preferably also greater than its depth, i.e. its depth extension. Preferentially a longitudinal direction of the groove is oriented at least substantially parallel to a longitudinal direction of the cutter holder. A "longitudinal direction" of an object is to be understood in particular as a direction which is parallel to an edge of a smallest geometrical rectangular cuboid just still encompassing the object. By a first direction being oriented "at least substantially parallel" to a second direction, it is in particular to be understood that the two directions include a minimum angle of maximally 30°, in particular maximally 20°, preferably maximally 10° and especially advantageously of no more than 5°. In a mounted state of the cutter holder at the comminution rotor, the longitudinal direction of the groove is in particular oriented at least substantially parallel to at least one radial direction of the comminution rotor. A "radial direction" of the comminution rotor is to mean, in this context, in particular a direction perpendicular with respect to the longitudinal axis of the comminution rotor. A "longitudinal center line" of the groove is to be understood, in particular, as a line which is in particular bent at least once and which extends along the groove and at least substantially directly along at least one surface of the cutter holder which delimits the groove, in particular along a bottom of the groove, and within a mirror-symmetry plane of the groove. By the longitudinal center line extending "at least substantially directly along" at least one surface of the cutter holder, it is in particular to be understood that the longitudinal center line extends by minimally 50%, in particular minimally 60%, preferably minimally 70% and especially advantageously minimally 80% directly along the surface. A "partial length" of the longitudinal center line is to be understood in particular as an at least substantially straight connection of two points located on the longitudinal center line, wherein all points of the partial length are located on the longitudinal center line. An "at least substantially straight connection" is to be understood in particular as a connection having an angular deviation of maximally 5°, in particular maximally 2.5° and preferentially maximally 1° along its longitudinal extension. By two partial lengths being oriented "at an angle with respect to each other" it is in particular to be understood that the partial lengths include an angle that differs from 0° and from 180°.

By such an implementation advantageously low operation costs may be achieved. In particular, by the angular arrangement of the partial lengths, a secure centering and an advantageously firm hold of the cutting device at the basis element, in particular in a direction perpendicular to the longitudinal axis of the comminution rotor, may be achieved, as a result of which wear-down can be kept advantageously low. Furthermore, easy and low cost manufacturing may allow advantageously low item costs, as the cutter holder can be embodied as a forging. It is further possible to make do with comparably low requirements regarding a manufacturing tolerance of the cutter holder.

In a preferred embodiment of the invention it is proposed that the partial lengths include a maximum angle of between 110° and 140°. In particular, the partial lengths include a maximum angle of between 115° and 135°, preferably between 120° and 130° and especially advantageously between 123° and 125°. Thereby a particularly secure centering and an especially advantageous hold of the cutting device at the basis element may be achieved.

In a particularly preferred embodiment of the invention it is proposed that the groove is delimited by at least two partial surface areas of the cutter holder, which are arranged at an angle of between 75° and 105° with respect to each other. In particular, the at least two partial surface areas are arranged at an angle of between 80° and 100°, preferably between 85° and 95° and especially advantageously between 89° and 91° with respect to each other. A "partial surface area" of the cutter holder delimiting the groove is to be understood, in particular, as a portion of a surface of the cutter holder, which is arranged directly adjacent to the groove. Preferentially the partial surface areas are embodied, at least partially and preferably at least to a major part, in a planar fashion. By a partial surface area being embodied "at least partially in a planar fashion", it is in particular to be understood that the partial surface area comprises at least one planar area having in particular an area content of at least 0.5 cm$^2$, preferably at least 1 cm$^2$ and especially advantageously at least 2 cm$^2$. By a partial surface area being embodied "at least to a major part in a planar fashion", it is to be understood in particular that the partial surface area comprises at least one planar area that amounts to at least 60%, in particular at least 70%, preferably at least 80% and especially advantageously at least 90% of a total surface of the partial surface area. By the partial surface areas being "arranged at an angle X with respect to each other" it is in particular to be understood that an angle between any surface normal of the first partial surface area and any surface normal of the second partial surface area differs from X by maximally 10°, in particular maximally 5° and preferentially maximally 1°. Thereby a centering and a hold of the cutting device at the basis element can be improved further. In particular, an advantageously high-degree lateral hold, in particular in a direction parallel to the longitudinal axis of the comminution rotor, is achievable. Moreover, an anti-twist protection of the cutting device with respect to the basis element can advantageously be provided.

It is further proposed that the groove has, along at least a major part of the longitudinal center line, an at least substantially triangle-shaped cross section. By an object having, along "at least a major part of the longitudinal center line", an at least substantially triangle-shaped cross section, it is in particular to be understood that the object has an at least substantially triangle-shaped cross section along a partial region, in particular also a piecewise partial region, of the longitudinal center line, the extent of which partial region corresponds to at least 50%, in particular at least 60%, preferably at least 70% and especially advantageously at least 80% of a total extent of the longitudinal center line. An "at least substantially triangle-shaped" cross section is to be understood, in this context, in particular as a cross section which differs from a triangular shape by an area portion of maximally 30%, in particular maximally 20%, preferentially maximally 10% and especially advantageously no more than 5%. The groove preferably has, in corresponding regions, a cross section of an isosceles triangle, wherein in particular legs of the isosceles triangle are defined by the partial surface areas. Hereby an advantageously secure hold of the cutting device at the basis element can be achieved by way of a simple design.

If the cutter holder is implemented at least substantially V-shaped in at least one lateral view, an advantageous introduction of a force may be achieved from the at least one cutter fastened to the cutter holder to the comminution rotor. By the cutter holder "being implemented at least substantially V-shaped in at least one lateral view" is to be understood, in particular, that the cutter holder has when viewed in a lateral view a shape which differs from a V-shape by an area portion of maximally 30%, in particular maximally 20%, preferably maximally 10% and especially advantageously maximally 5%. Preferentially the at least one cutter carried by the cutter holder is arranged at an end of the cutter holder, as a result of which advantageously a wear-down of the cutter holder may be minimized. Furthermore, at least one shield element, which is made of a mechanically more robust material than the cutter holder and which is provided to protect the cutter holder from wear-down, may be additionally provided at the cutter holder. Said shield element is preferably arranged below the cutter on a side of the cutter holder which is situated opposite the groove.

The cutting device advantageously comprises at least two cutters, which are arranged at opposite ends of the cutter holder on a side of the cutter holder which is situated opposite the groove. Hereby a maintenance input may advantageously be reduced and a service life may advantageously be lengthened. When the first cutter being in operation has been worn down in such a way that a replacement is necessary, the cutter holder can be rotated by 180°, such that the second cutter is used in the comminution from then on. Actual replacement of the cutters and/or the cutter holder is only necessary when both cutters have been worn down.

In a further embodiment of the invention, it is proposed that the cutter holder has at least one recess for passing through a connection means that is provided for fastening the cutter holder to the basis element. Preferably the recess is embodied in such a way that it entirely passes through the cutter holder and is preferentially surrounded by material of the cutter holder on all sides. The cutter holder preferably has exactly one recess. Preferentially the recess is at least substantially cylindrical, at least in a partial region. The recess being in the partial region "at least substantially cylindrical" is to mean in particular that a form of the recess in the partial region differs from a cylinder by a volume portion of maximally 20%, in particular maximally 10%, preferably no more than 5% and especially advantageously no more than 1%. The recess may in particular be delimited by a wall having a thread. Preferentially, however, the wall delimiting the recess is embodied at least substantially smooth. The connection means may be any connection means deemed expedient by the person skilled in the art, in particular a bolt-like connection means, preferably a thread rod and especially advantageously a screw. As a result of this, an advantageous and in particular releasable hold of the cutting device at the basis element can be achieved. If, in a mounted state of the cutting device on the comminution rotor, a longitudinal direction of the recess is oriented at an angle of between 70° and 110°, in particular between 80° and 100°, preferentially between 85° and 95° and especially advantageously between 88° and 92° with respect to a longitudinal axis of the comminution rotor, a maintenance input may be advantageously reduced as, due to advantageous accessibility of the connection means, a replacement of the cutting device can be effected in an advantageously simple manner.

It is further proposed that an outer contour of the cutter holder is, in a region of the recess, thickened with respect to a surrounding region. An "outer contour" of the cutter holder is to be understood, in this context, in particular as a smallest convex geometrical body which just still encompasses the cutter holder. By the outer contour being, in a region of the recess, "thickened" with respect to a surrounding region, it is in particular to be understood that the outer contour has, in the region of the recess, a greater extent perpendicularly to a longitudinal direction of the outer contour than it has in the surrounding region. Hereby a sufficiently high degree of strength of the cutter holder may be ensured, in particular in the region of the recess.

Preferably the cutter holder is, as regards rotations by 180°, at least substantially rotationally symmetrical with respect to a rotational symmetry axis of the recess. By a "rotational symmetry axis" of an object in particular an axis is to be understood which in particular pierces the object and by which the object is rotatable, in particular by at least one certain angle, such that the rotated object and the original object coincide with each other. By the cutter holder being "at least substantially rotationally symmetrical" as regards rotations by 180°, it is in particular to be understood that the cutter holder is, in rotations by 180°, transferred into itself by a volume portion of at least 75%, in particular at least 80%, preferably at least 90% and especially advantageously at least 95%. Preferentially, in rotations by 180°, the cutter holder is transferred into itself at least not regarding markings, in particular letterings and/or logos.

If the cutter holder comprises, on a side opposite the groove, directly adjacent to the recess, a receptacle for a screw head and/or a nut, an advantageous protection may be achieved for the screw head and/or the nut. The receptacle has in particular a greater cross-section extent than the recess. Preferably the receptacle is provided for positive-fit receiving a hexagon screw head and/or a hexagon nut, such that an assembly may advantageously be simplified, as a counter-holding with a tool when screwing the cutter holder to the basis element can be omitted.

The invention is further based on a basis element for a comminution rotor, in particular for comminuting wood and/or soil, in particular for mulching, shredding and/or chopping, with at least one abutment part that is provided to be connected to a cutting device, in particular a cutting device according to the invention.

It is proposed that the abutment part has at least one longitudinal center line extending directly along at least a surface of the abutment part and comprising at least two partial lengths which are oriented at an angle with respect to each other. An "abutment part" of the basis element is, in this context, to be understood in particular as a partial region of the basis element, which is provided to be at least partially received by the groove in a mounted state. In the mounted state the at least two partial surface areas of the cutter holder delimiting the groove at least partially engage around the abutment part of the basis element. Preferably the abutment part is free of markings, in particular letterings and/or logos. By a "longitudinal center line" of the abutment part in particular a line is to be understood which is in particular bent at least once, and which extends along the abutment part and at least substantially directly along the surface of the abutment part and within a mirror symmetry plane of the abutment part. By the longitudinal center line extending "at least substantially directly along" the surface of the abutment part, it is in particular to be understood that the longitudinal center line extends by at least 50%, in particular at least 60%, preferably at least 70% and especially advantageously at least 80% directly along the surface. Preferentially the abutment part has, viewed along at least a major part of the longitudinal center line, an at least substantially triangle-shaped cross section. Preferably the abutment part has in corresponding regions a cross section of an isosceles triangle, wherein in particular legs of the isosceles triangle are defined by the surface. As a result of this, advantageously low operation costs can be achieved. In particular, a secure centering and an advantageously firm hold of the cutting device at the basis element, in particular in a direction perpendicular to the longitudinal axis of the comminution rotor, can be achieved by the angled arrangement of the partial lengths, as a result of which wear-down may be kept advantageously low. Moreover advantageously low item costs may be possible due to simple and low-cost manufacturing, as the basis element can be embodied as a forging part. It is further possible to make do with comparably low requirements regarding a manufacturing tolerance of the basis element.

In a preferred embodiment it is proposed that the partial lengths include a maximum angle of between 110° and 140°. In particular, the partial lengths include a maximum angle of between 115° and 135°, preferably between 120° and 130° and especially advantageously between 123° and 125°. Hereby an especially secure centering and an especially advantageous hold of the cutting device at the basis element may be achieved. The angle between the partial lengths of the longitudinal center line of the abutment part may in particular differ from the angle between the partial lengths of the longitudinal center line of the groove, in particular by maximally 2.5°, in particular by maximally 2°, preferably no more than 1.5° and especially advantageously by no more than 1°, as a result of which a certain tension is achievable between the cutter holder and the basis element. Hereby a loosening of the connection between cutter holder and basis element, due in particular to mechanical and/or thermal conditions, may advantageously be countered. Preferentially the surface of the abutment part comprises at least two partial surface areas, which are arranged at an angle of between 75° and 105°, in particular between 80° and 100°, advantageously between 85° and 95° and especially advantageously between 89° and 91° with respect to each other. The partial surface areas are preferably embodied planar, at least partially and preferentially at least to a major part. As a result of this, a centering and a holding of the cutting device at the basis element can be further improved. In particular, an advantageously great lateral hold, in particular in a direction parallel to the longitudinal axis of the comminution rotor, is achievable. Furthermore, an anti-twist protection of the cutting device with respect to the basis element is advantageously providable. In particular, the angle between the partial surface areas of the abutment part can differ from the angle between the partial surface areas of the cutter holder, in particular by maximally 2°, in particular maximally 1.5°, preferably no more than 1° and especially advantageously 0.5°. Preferentially, in this case the angle between the partial surface areas of the cutter holder is a right angle, and the angle between the partial surface areas of the abutment part is an angle differing from a right angle in particular by at least 0.25° and preferably by no more than 1°. Thereby a further tensioning may be achieved between the cutter holder and the basis element.

Furthermore a comminution rotor is proposed, with at least one basis element according to the invention and with at least one cutting device according to the invention that is fastened to the basis element. Hereby a comminution rotor with advantageously low operation costs can be provided.

DRAWING

Further advantages may be gathered from the following description of the drawing. In the drawing an exemplary embodiment of the invention is depicted. The description and the claims contain a plurality of features in combination. The person skilled in the art will purposefully also consider the features separately and will create further expedient combinations of them.

Figure 2:
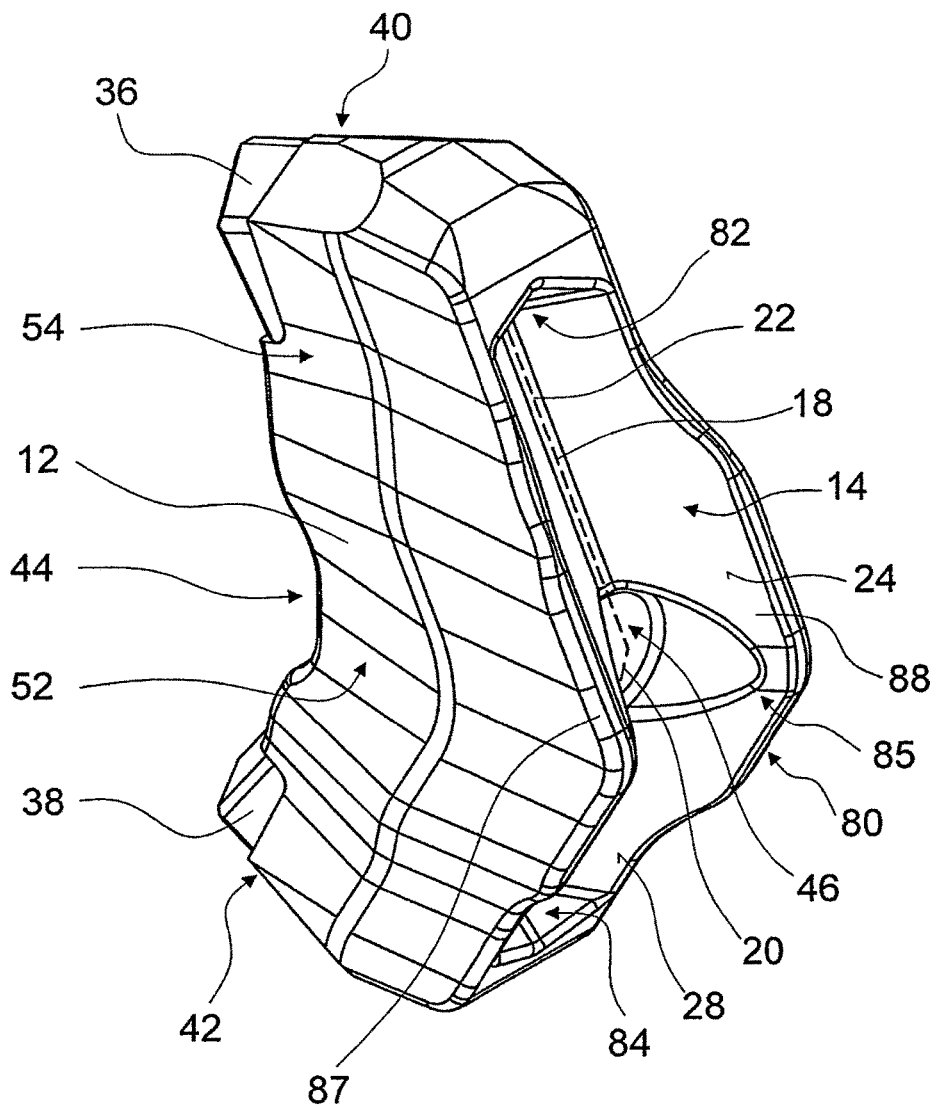
Figure 3:
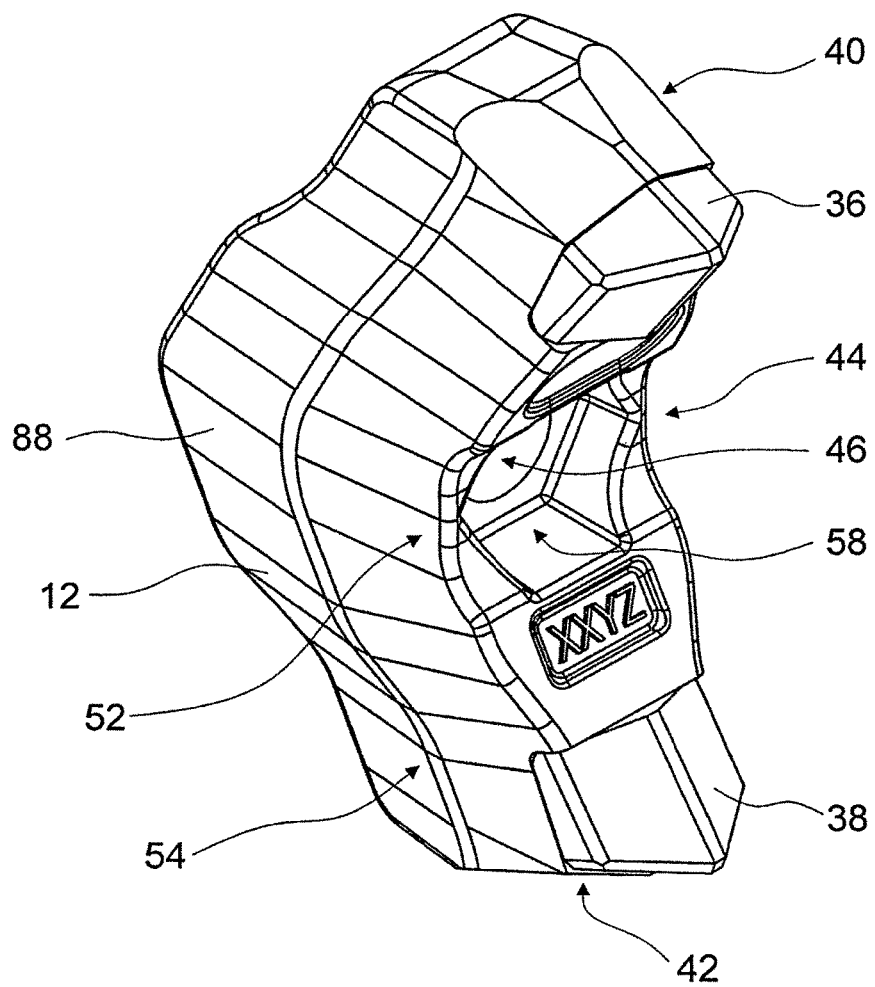
Figure 4:
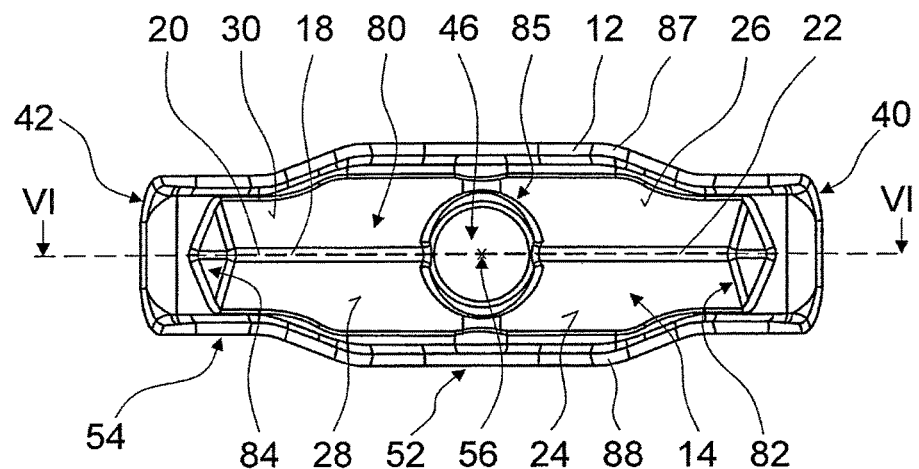
Figure 5:
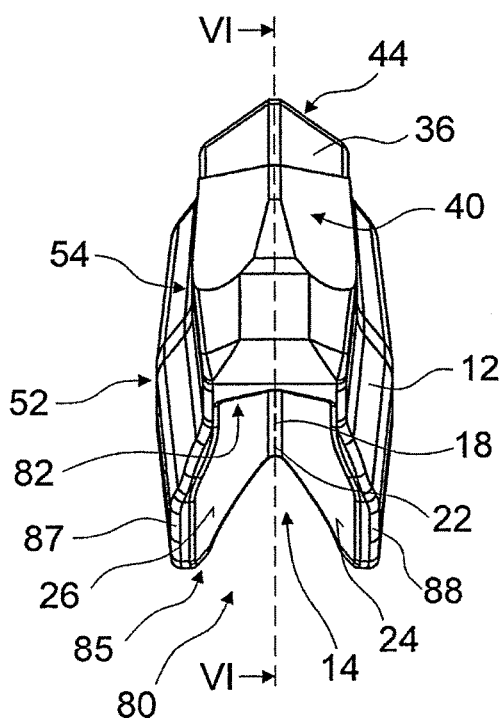
Figure 6:
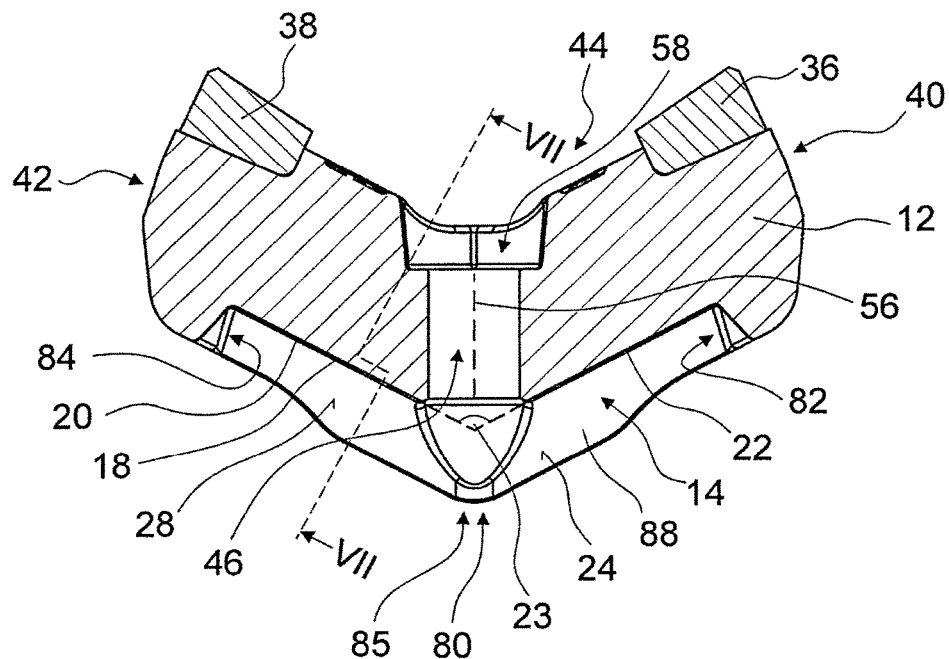
Figure 7:
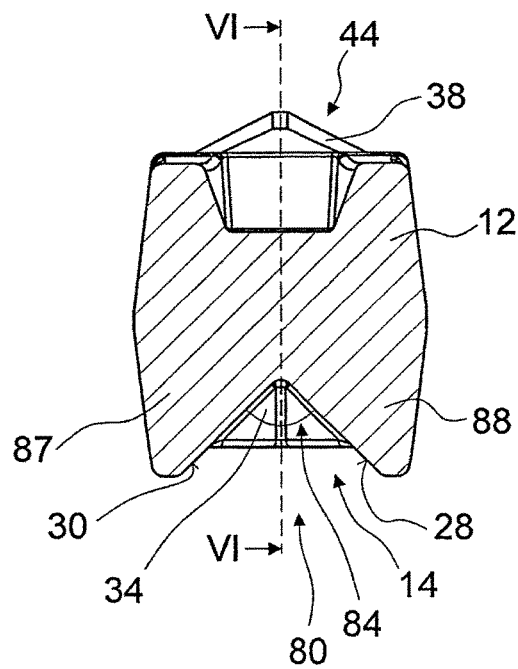
Figure 8:
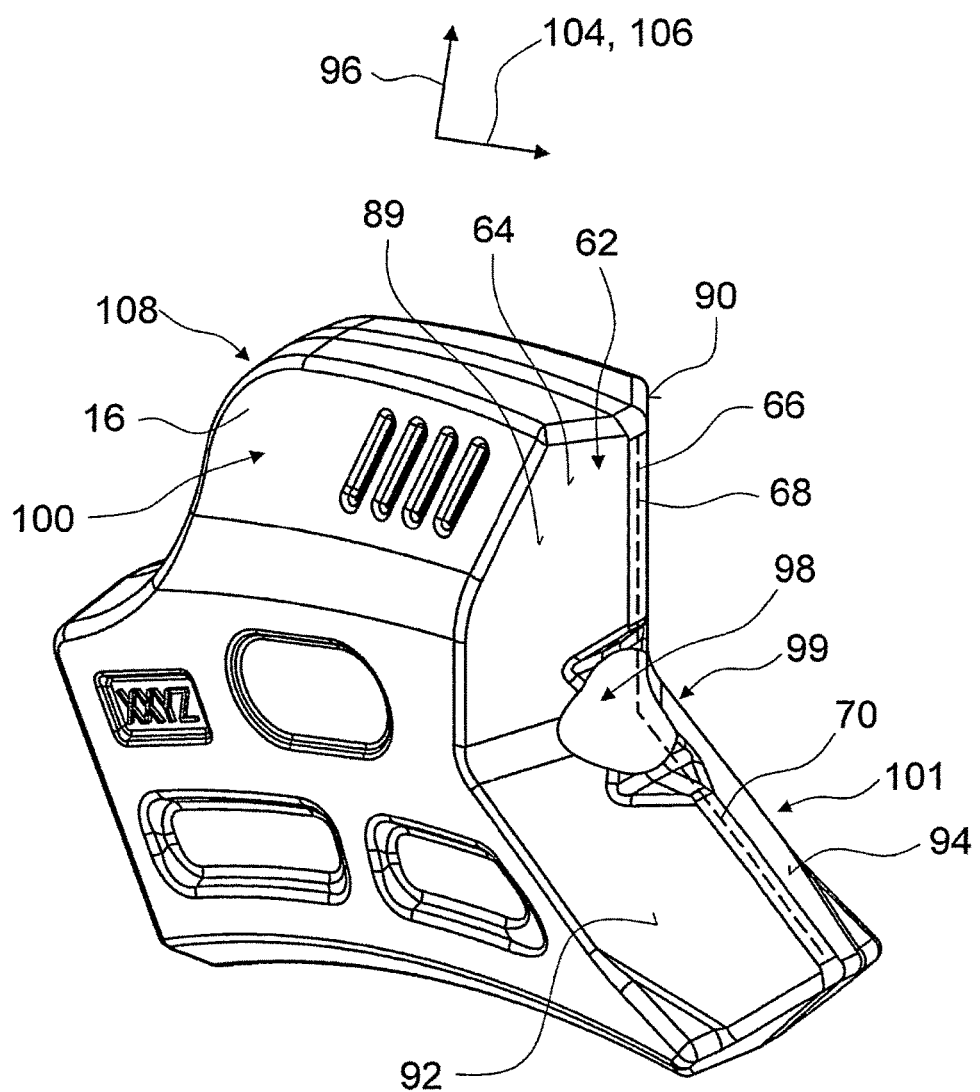
Figure 9:
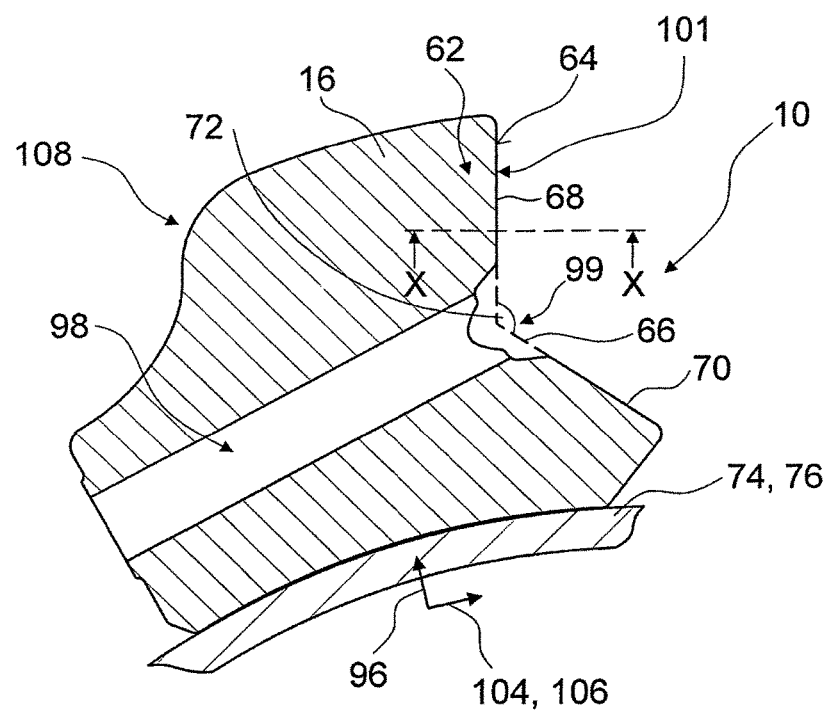
Figure 10:
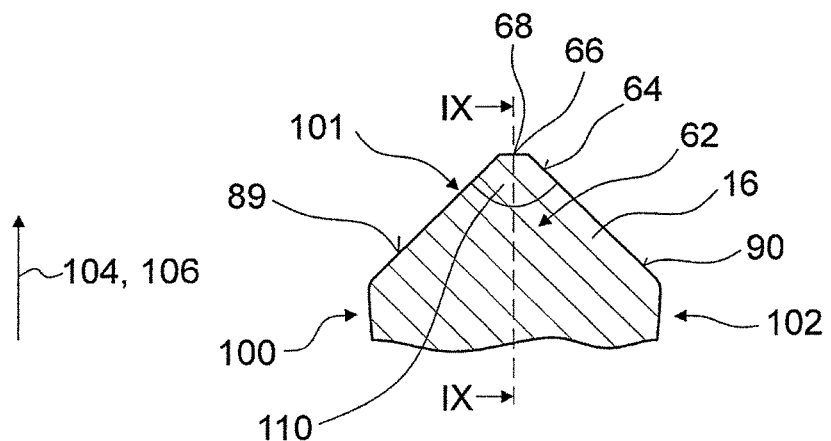
Figure 11:
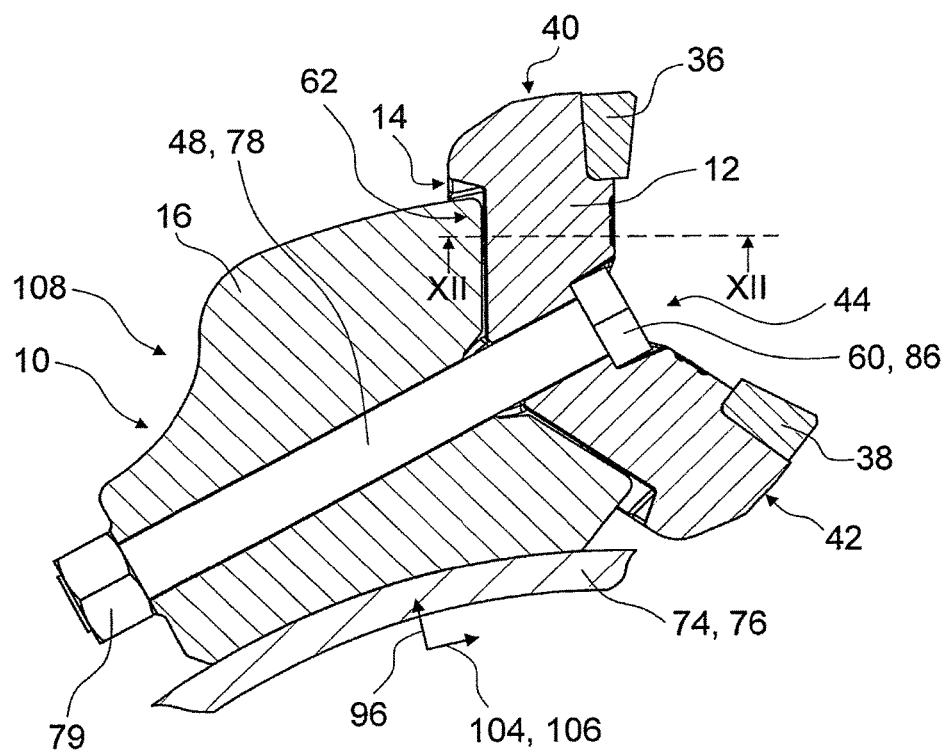
Figure 12:
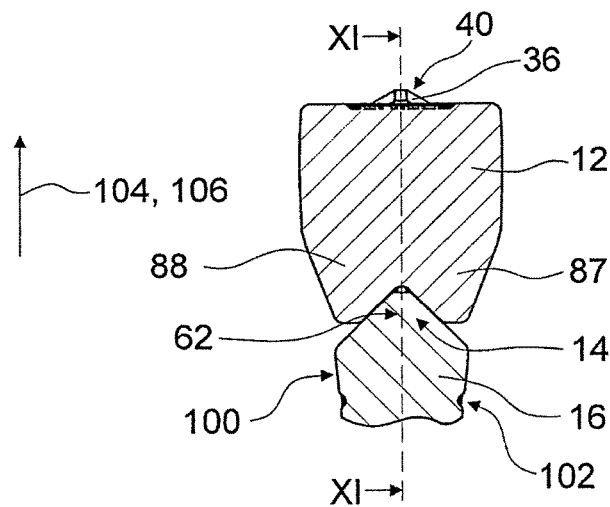

The following is shown in:

FIG. 1 a portion of a comminution rotor with a base body, with a basis element fastened to the base body and with a cutting device mounted to the basis element in an isometric presentation from the front, the cutting device comprising a cutter holder and two cutters carried by the cutter holder, FIG. 2 the cutting device, the cutter holder of which has a groove at a rear side, in an isometric separate presentation from the rear, FIG. 3 the cutting device in an isometric separate presentation from the front, FIG. 4 the cutting device in a view from above, from the rear, FIG. 5 the cutting device in a lateral view, FIG. 6 the cutting device in a sectional view along a line VI-VI in FIG. 4, FIG. 7 the cutting device in a sectional view along a line VII-VII in FIG. 6, FIG. 8 the basis element in an isometric presentation from the front, FIG. 9 the basis element fastened to the base body in a sectional view, FIG. 10 the basis element in a sectional view along a line X-X in FIG. 9, FIG. 11 the portion of the comminution rotor in a sectional view, and FIG. 12 the portion of the comminution rotor in a sectional view along a line XII-XII in FIG. 11.

DESCRIPTION OF THE EXEMPLARY EMBODIMENT

FIG. 1 shows a portion of a comminution rotor 10 which is provided in particular for comminuting wood and/or soil. Comminution rotors 10 of such a kind are in particular applied in add-on tools for utility vehicles, in particular for mulching and/or shredding. The comminution rotor 10 comprises a base body 74. The base body 74 is embodied roller-shaped. The base body 74 is designed in a form of a tube 76. The base body 74 is made of steel. The comminution rotor 10 comprises a plurality of basis elements 16, only one of which is shown in FIG. 1. The basis elements 16 are arranged spaced apart from one another in a circumferential direction 104 of the base body 74. The basis elements 16 are connected to the base body 74 in a fixed, in particular a torque-proof, manner. The basis elements 16 are welded to the base body 74. To each of the basis elements 16 a cutting device of the comminution rotor 10 is fastened. The respective cutting devices each comprise a cutter holder 12 and two cutters 36, 38 carried by the cutter holder 12. The cutting devices are connected to the basis elements 16 in a torque-proof manner. The cutting devices are each connected to the basis elements 16 via a respective connection means 48. The connection means is a screw 78, which is fastened by way of a nut 79.

FIG. 2 shows one of the cutting devices in an isometric separate presentation from the rear. The cutter holder 12 is made of steel. The cutter holder 12 is embodied as a forging part. The cutter holder 12 of the cutting device comprises, on its rear side 80, a groove 14 which is provided to at least partially receive one of the basis elements 16. The groove 14 herein comprises a longitudinal center line 18 with at least two partial lengths 20, 22 that are oriented at an angle with respect to each other (cf. also FIG. 6). The groove 14 is oriented in a longitudinal direction of the cutter holder 12. The groove 14 extends from surroundings of a first end 40 of the cutter holder 12 to surroundings of a second end 42 of the cutter holder 12. The groove 14 is embodied closed at both its ends 82, 84. The groove 14 is oriented, in an assembled state of the comminution rotor 10, at least substantially in a radial direction 96 of the base body 74 (cf. also FIGS. 1 and 11). The groove 14 has a bending point 85. The groove 14 is delimited by partial surface areas 24, 26, 28, 30 of the cutter holder 12 (cf. also FIG. 4).

FIG. 3 shows the cutting device in an isometric separate presentation from the front. The two cutters 36, 38 of the cutting device are arrange at both ends 40, 42 of the cutter holder 12 on a side 44 of the cutter holder 12 which is situated opposite the groove 14. The cutters 36, 38 are made of a hardened steel or some other suitable material. The cutters 36, 38 have a greater hardness than the cutter holder 12. The cutters 36, 38 are connected to the cutter holder 12 in a one-part implementation. The cutters 36, 38 are soldered to the cutter holder 12. The cutters 36, 38 each extend, at the respective ends 40, 42 of the cutter holder 12, across an entire width of the cutter holder 12, such that the ends 40, 42 of the cutter holder 12 are at least partially protected from wear-down by the cutters 36, 38. The cutter 36 which is, in the assembled state of the comminution rotor 10, spaced farther apart from a rotational axis of the base body 74, is in a comminution process brought into contact with a material to be comminuted by a rotation of the comminution rotor 10 about its longitudinal axis.

FIG. 4 shows the cutting device in a view from above, from the rear. A width of the groove 14 substantially corresponds, in any point along a longitudinal extension of the cutter holder 12, to a width of the cutter holder 12 (cf. also FIG. 5). The cutter holder 12 has a recess 46 for passing through the connection means 48. The recess 46 is embodied in a cylindrical shape. An outer contour of the cutter holder 12 is, in a region 52 of the recess 46, thickened with respect to a surrounding region 54 (cf. also FIG. 2). Walls 87, 88 which delimit the groove 14, are designed in the region 52 in a shape which allows receiving the connection means 48 (cf. also FIG. 2). The cutter holder 12 is, as regards rotations by 180°, at least substantially rotationally symmetrical with respect to a rotational symmetry axis 56 of the recess 46, such that the cutter holder 12 is mountable to the basis element 16 in two different situational orientations. Hereby a service life of the cutting device can be lengthened, allowing a full replacement of the cutting device to be done less frequently. On the contrary, in the case of heavy wear-down of one of the cutters 36, 38, the cutter holder 12 can be rotated by 180° and then fixed to the basis element 16 such that from then on the other cutter 36, 38 comes into use in the comminution process.

FIG. 5 shows the cutting device in a lateral view onto the end 40 of the cutter holder 12.

FIG. 6 shows the cutting device in a sectional view along a line VI-VI in FIG. 4. The partial lengths 20, 22 of the longitudinal center line 18 include a maximum angle 23 of 125°. The longitudinal center line 18 herein partially extends across the region 52 of the recess 46. The cutter holder 12 comprises, directly adjacent to the recess 46, on the side 44 opposite the groove 14, a receptacle 58 for a screw head 60 of the connection means 48. The receptacle 58 has a hexagonal cross section (cf. also FIG. 3). The receptacle 58 is provided for positive-fit receiving of a hexagonal screw head 86, as a result of which a mounting of the cutter holder 12 at the basis element 16 can be simplified, as a counter-holding can be done without (cf. also FIG. 1). To the purpose of protecting the screw head 60, the receptacle 58 is embodied of such a depth that in an assembled state the screw head 60 is counter-sunk at least to a major part in the receptacle 58. The cutter holder 12 is embodied at least essentially V-shaped in at least one lateral view, the cutters 36, 38 being arranged at the protruding ends 40, 42 of the cutter holder 12. The walls 87, 88 delimiting the groove 14 are in the region 52 of the recess 46 embodied higher than in the surrounding region 54 (cf. also FIG. 5).

FIG. 7 shows the cutting device in a sectional view along a line VII-VII in FIG. 6. The respectively two partial surface areas 24, 26, 28, 30 delimiting the groove 14, which are in an assembled state of the comminution rotor 10 spaced apart from the rotational axis of the base body 74 by equal distances, are arranged at an angle 34 of 89° with respect to each other. The groove 14 thus has, along at least a major part of the longitudinal center line 18, a cross-section of an isosceles triangle, legs of the triangle being formed by the partial surface areas 24, 26, 28, 30 (cf. also FIG. 2).

FIG. 8 shows one of the basis elements 16 in an isometric presentation from the front. The basis element 16 is made of steel. The basis element 16 is implemented as a forging part or a casting part. The basis element 16 comprises an abutment part 62, which is provided to be at least partially received by the groove 14 of the cutter holder 12 when connected to the cutting device (cf. also FIG. 1). In the assembled state, the walls 87, 88 at least partially engage around the abutment part 62. The abutment part 62 comprises partial surface areas 89, 90, 92, 94, which are provided to contact the partial surface areas 24, 26, 28, 30 of the cutter holder 12 in an assembled state (cf. also FIGS. 2 and 4). The abutment part 62 comprises a longitudinal center line 66 extending directly along a surface 64 of the abutment part 62, with at least two partial lengths 68, 70 which are oriented at an angle with respect to each other. The basis element has a recess 98 for the connection means 48, corresponding to the recess 46 of the cutter holder 12 (cf. also FIGS. 9 and 11). The recess 98 is, in the assembled state of the comminution rotor 10, orientated at least substantially in the circumferential direction 104 of the base body 74. The longitudinal center line 66 extends at least partially across and beyond the recess 98. In a region 99 of the recess 98, the abutment part 62 is, with respect to a surrounding region 101, set back to the rear, i.e. counter to a rotational direction 106 of the comminution rotor 10. Lateral flanks 100, 102 of the basis element 16 are embodied tapering towards each other, to the rear (cf. also FIG. 10), as a result of which a wear-down of the basis element 16 by comminuted material and/or by entering the soil can be reduced. Further a radially outer flank 108 of the basis element 16 is embodied tapering towards the base body 74 in a direction counter to the rotational direction 106.

FIG. 9 shows the basis element 16 fastened to the base body 74 in a lateral sectional view. The partial lengths 68, 70 include a maximum angle 72 of 124°.

FIG. 10 shows the basis element 16 in a sectional view along a line X-X in FIG. 9. Respectively two partial surface areas 89, 90, 92, 94, which are spaced apart from the rotational axis of the base body 74 at an equal distance in the assembled state of the basis element 16, are arranged at an angle 110 of 90° with respect to each other.

FIG. 11 shows the portion of the assembled comminution rotor 10 in a lateral sectional view through the longitudinal center line 18 of the groove 14 of the cutter holder 12 and the longitudinal center line 66 of the abutment part 62 of the basis element 16. The groove 14 and the abutment part 62 are adapted to each other in such a way that the abutment part 62 at least partially fits into the groove 14 and is, in the assembled state, at least partially engaged around by the cutter holder 12. Due to the angles 23, 72 between the partial lengths 20, 22 of the longitudinal center line 18 and the partial lengths 68, 70 of the longitudinal center line 66 slightly differing from each other, a tensioning of the cutter holder 12 with the basis element 16 occurs with tightening of the connection means 48 (cf. also FIGS. 6 and 9). Hereby a loosening and/or overstress of the connection means 48 due to operational and/or temperature conditions can be avoided.

FIG. 12 shows the portion of the comminution rotor 10 in a sectional view along a line XII-XII in FIG. 11. Due to the angles 34, 110 between, on the one hand, respective two partial surface areas 24, 26, 28, 30 of the cutter holder 12 which have, in the assembled state of the comminution rotor 10, equal distances from the rotational axis and, on the other hand, respective two partial surface areas 89, 90, 92, 94 of the abutment part 62, which have, in the assembled state of the comminution rotor 10, equal distances from the rotational axis, slightly differing, an additional tensioning of the cutter holder 12 with the basis element 16 occurs when tightening the connection means 48 (cf. also FIGS. 7 and 10). Hereby a loosening and/or overstress of the connection means 48 due to operational and/or temperature conditions can be especially advantageously avoided. As there is a positive locking present in the assembled state between the cutter holder 12 and the abutment part 62 of the basis element 16, a fixing of the cutter holder 12 results with respect to the basis element 16 in the circumferential direction 104 as well as in the radial direction 96.

In an alternative implementation, small plates made of a hard metal may be additionally provided at a front side having cutters of the cutter holder, between a recess for receiving a connection means and the cutters, to the purpose of reducing weardown. Furthermore, cutters with a different implementation are conceivable, in particular also cutters screwed to a cutter holder.

The invention claimed is:

1. A cutting device for a comminution rotor, wherein
   the cutting device includes a cutter holder and a cutter,
   the cutter holder has a groove, which is configured to at least partially receive a basis element of the comminution rotor,
   the groove has a longitudinal center line, which has at least two partial lengths that are oriented at an angle with respect to each other, and
   the groove is delimited by two partial surface areas of the cutter holder, wherein the two partial surface areas are arranged at an angle of between 80° and 100° with respect to each other.

2. The cutting device according to claim 1, wherein the two partial lengths include a maximum angle of between 110° and 140°.

3. The cutting device according to claim 1, wherein the groove of the cutter holder has, along at least a major part of the longitudinal center line, a triangular cross section.

4. The cutting device according to claim 1, wherein the cutter holder is implemented to be at least substantially V-shaped in at least one lateral view.

5. The cutting device according to claim 1, wherein the cutter is one of two cutters, which are arranged at opposite ends of the cutter holder, at a side of the cutter holder that is situated opposite to the groove.

6. The cutting device according to claim 1, wherein the cutter holder has a recess for passing through a connection that is provided for fastening the cutter holder to the basis element.

7. The cutting device according to claim 6, wherein an outer contour of the cutter holder is, in a region of the recess, thickened with respect to a surrounding region.

8. The cutting device according to claim 6, wherein the cutter holder is rotationally symmetrical when rotated by 180° about a rotational symmetry axis of the recess.

9. The cutting device according to claim 6, wherein the cutter holder comprises a receptacle for a screw head and/or a nut, wherein the receptacle is situated directly adjacent to the recess on a side opposite to the groove.

10. The cutting device according to claim 6, wherein the groove is rotationally symmetrical in a vicinity of the recess when rotated by 180° with respect to a rotational symmetry axis of the recess.

11. The cutting device according to claim 1, wherein the cutter is located at an end of the cutter holder and extends beyond the at least one groove.

12. The cutting device according to claim 1, wherein the angle by which the partial lengths are oriented with respect to each other is a maximum angle of between 120° and 130°.

13. The cutting device according to claim 1, wherein the two partial surface areas of the cutter holder are arranged at an angle of between 85° and 95°.

14. The cutting device according to claim 1, wherein the two partial surface areas form a first pair of partial surface areas, and the groove is further delimited by a second pair of partial surface areas of the cutter holder, which are arranged angularly with respect to the first pair of partial surface areas, and wherein the partial surface areas of the second pair are arranged at an angle of between 80° and 100° with respect to each other.

15. The cutting device according to claim 1, wherein the groove has a closed end.

16. A cutting device for a comminution rotor, wherein the cutting device comprises:
    a cutter holder;
    a cutter carried by the cutter holder; and
    a groove, which is arranged at a side of the cutter holder that is situated opposite to the cutter, wherein
    the groove has a longitudinal center line, which has at least two partial lengths that are oriented at an angle with respect to each other, and
    the groove is delimited by two partial surface areas of the cutter holder, which are arranged at an angle of between 80° and 100° with respect to each other.

17. A cutting device for a comminution rotor, wherein the cutting device comprises:
    a cutter holder;
    a cutter; and
    a groove, which is configured to at least partially receive a basis element of the comminution rotor, wherein
    the groove has a longitudinal center line, which has at least two partial lengths that are oriented at an angle with respect to each other,
    the groove is delimited by a first partial surface area, a second partial surface area, a third partial surface area and a fourth partial surface area of the cutter holder,
    the first partial surface area and the second partial surface area are arranged at an angle of between 80° and 100° with respect to each other, and
    the third partial surface area and the forth partial surface area are arranged at an angle of between 80° and 100° with respect to each other.

* * * * *